Sheet 1, 3 Sheets.
J. Lough.
Dressing Saw Teeth.
No. 3,703. Reissued Nov. 9, 1867.
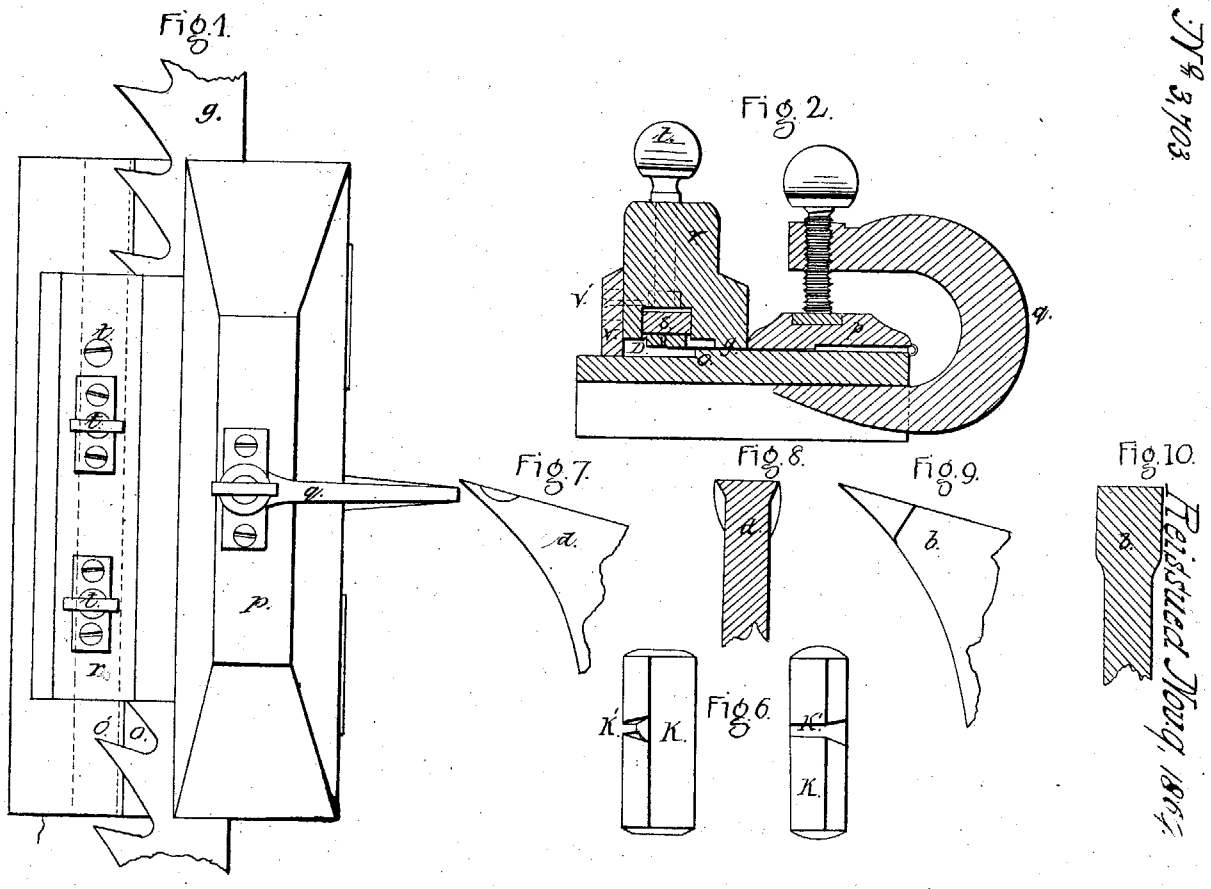
Witnesses:
C. A. Pettit
S. Keegan
Inventor:
John Lough
by Munn & Co
Attorneys
THE NORRIS PETERS CO., WASHINGTON, D. C.

J. Lough.

Dressing Saw Teeth.

No. 3,703. Reissued Nov. 9, 1869.

Witnesses:
E. A. Pettit
S. C. Manor

Inventor:
John Lough
by Munn & Co.
Attorneys

THE NORRIS PETERS CO., WASHINGTON, D. C.

Sheet 3, 3 Sheets.
J. Lough.
Dressing Saw Teeth.
No. 3,703. Reissued Nov. 9, 1869.
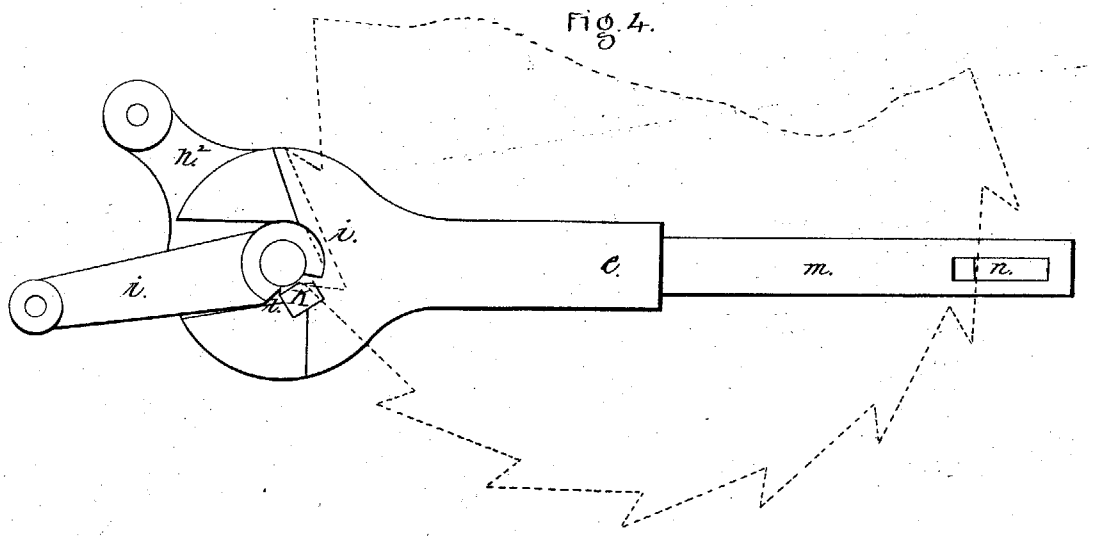
Witnesses:
C. A. Pettit
E. C. Kemon
Inventor:
John Lough
by Munn & Co
Attorneys
THE NORRIS PETERS CO., WASHINGTON, D. C.

United States Patent Office.

JOHN LOUGH, OF BUCKINGHAM VILLAGE, QUEBEC.

*Letters Patent No.* 84,365, *dated November* 24, 1868; *reissue No.* 3,703, *dated November* 2, 1869.

IMPROVEMENT IN DRESSING SAW-TEETH

The Schedule referred to in these Letters Patent and making part of the same.

*To all whom it may concern:*

Be it known that I, JOHN LOUGH, of the village of Buckingham, in the county of Ottawa, in the Province of Quebec, millwright, being a British subject, and a resident of the Province of Quebec, have invented a new and useful Improvement in Saw-Teeth, and in the apparatus for forming the same; and I do hereby declare the following to be a full, clear, and exact description of the construction and operation of the same, reference being had to the accompanying drawings, forming part of this specification, and in which—

Figure 1 represents a plan view of saw-dressing machine.

Figure 2 represents a section of the same.

Figure 4 represents a side elevation of the same, with one side removed, and arranged for circular saws.

Figure 6 represents details of die.

Figures 7 and 8 represent details of ordinary saw-teeth.

Figures 9 and 10 represent details of improved saw-teeth.

Figures 3, 5:
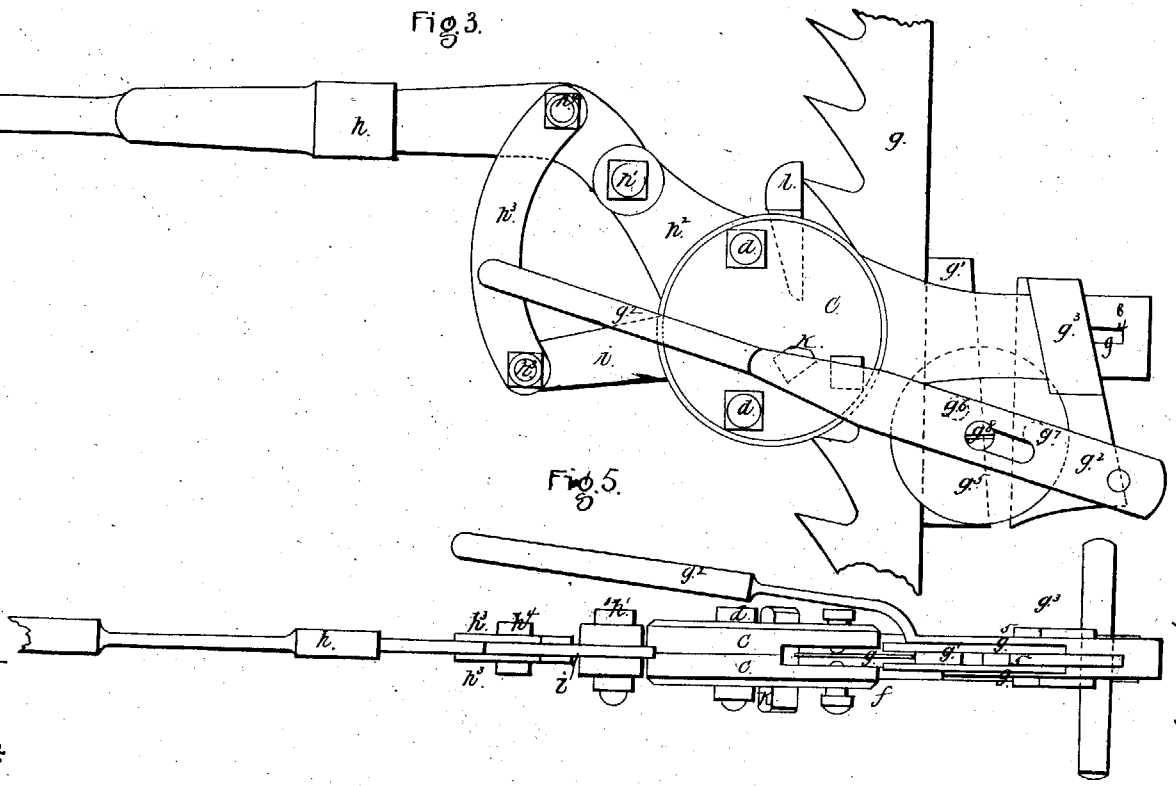
Figure 3 represents a side elevation of saw-tooth press.
Figure 5 represents a back elevation of saw-tooth press.

This invention has reference to the improvement in the shape or form of saw-teeth, either in straight or circular saws, and also in the apparatus necessary for forming the said improved teeth.

First, with reference to the form of the teeth. In the ordinary plan adopted for constructing and shaping saw-teeth, the teeth are first cut out by dies. A taper steel bar is then held on the under side of each tooth and hammered on the opposite or upper side of the tooth. The effect of this is to widen the point of the tooth on the upper side. The point of the tooth is then filed to the required degree of sharpness and "set."

The defect of this mode of "swaging" or of widening the tooth, as described, is, that the under or cutting-side of the tooth remains "narrow," whereas, by my improvement, this portion of the tooth is "widened" at a point where such is actually required, in order to efficient cutting when employed in sawing timber, thus reversing the ordinary condition or shape of the saw at this important point.

Another defect in the ordinary form of setting the saw is also obviated by my invention. In place of treating each tooth separately by a hammer and file, a "dressing-machine," extending over a considerable number of teeth, or, indeed, over the entire number, if required, at one and the same time, is employed, and the same treatment extended to each tooth simultaneously, thereby avoiding any difference, and creating complete uniformity.

The peculiar form given to the lower or cutting-side of each tooth is accomplished by passing the saw, either straight or circular, through a peculiar apparatus, the unformed point of each tooth passing into a peculiar-shaped steel die, and pressure applied by a powerful lever, which has the effect of making the tooth assume the shape of the die, or, in other words, the widened under cutting-surface before mentioned, each tooth of the saw being subjected, in turn, to this treatment.

When, after much use, the teeth of the saw become impaired or worn out, the saw is straightened and "gummed," and put through the same process for widening the teeth, by the employment of my apparatus.

In the drawings, similar letters of reference indicate corresponding parts.

*a*, figs. 7 and 8, is the ordinary form of saw-teeth, widened on the upper side, as shown in the drawings, while *b*, figs. 9 and 10, represents my improved tooth, widened on the opposite or under side.

This part of the improvement being so clearly shown in the drawings, and while being of great importance, yet is of so simple a character as to require no further description, I will therefore proceed to describe that part of the apparatus used for giving the tooth the shape required.

It consists of two steel plates *c c*, of the general form shown in figs. 3 and 5, bolted firmly together by screw-bolts *d d*.

The projection *e*, forming part of the plates referred to, is provided with a slotted space, *f*, for the reception of the saw *g* and guide-wedge key $g^1$, for holding the saw firmly in place against the die when being operated on.

$g^2$ is a lever, attached to the projection *e* of the plate *c c* by a strap, $g^3$, which is provided with two mortises or apertures, for the reception of the ends of the two projections, and held in place by the cross-key $g^4$.

Attached to this lever $g^2$ is a double eccentric, $g^5$, with an intervening space, as shown in fig. 5, for the reception of the guide-wedge key $g^1$ and back of saw *g*.

This guide-wedge key $g^1$ is held in place by a steel pivot, $g^6$, passing through it, as well as each of the eccentrics, and allowing a free motion to the eccentrics and wedge-key.

The eccentrics themselves are also secured to the strap $g^3$ by a second pivot, $g^7$.

The eccentrics are placed, one on each side of the strap, and have a free motion on the pivot described.

The eccentrics are also connected to the lever $g^2$ by a pivot, $g^8$, working freely in the lever by means of the elongated slot.

$h$ is a second lever, attached to the plate $c$ $c$ by a pivot-arrangement, $h^1$, with the projections $h^2$, from the plates.

This lever $h$ is slightly bent near its inner end, as shown in fig. 3, and passes, at that point, between two guide-straps, $h^3$, and is attached to them by the pivot $h^4$.

Those curved connecting-straps are again attached, by a pivot, $h^5$, to the outer end of a compression-bar, $i$, shown in figs. 3 and 4.

This compression-bar is of steel, with great strength, and is used for pressing the point and under side of the tooth into the die, to be presently described.

This compression-bar has the form shown in fig. 4, and works freely between the two steel plates $c$ $c$, in a suitable recess provided for that purpose.

The inner end of this slot is circular, and deepened, for the reception of the circular flanged end of the compression-bar, which fits and works accurately into it, both above and below.

A portion of the circular end of this compression-bar is removed, as shown at $i^1$, in fig. 4. A square shoulder is thereby formed in the end of the bar, adjacent to the saw-tooth, and which comes in contact with it, and presses it squarely into the die.

A small groove is provided on the inner end of the compression-bar, as indicated by the dotted lines at $i^2$, possessing a width about equal to the thickness of a saw.

The object of this groove is to permit the passage of the teeth of saws with a small pitch.

$k$ is a strong steel die, passing entirely through both plates $c$ $c$, in the position indicated in figs. 3, 4, and 5.

The peculiar form of this die is shown in fig. 6. At or near its centre it is provided with a bevelled check or recess, $k'$, as shown in the drawings, for receiving the tooth, and giving it the required shape.

$l$ is a guide-strip, inserted between the two plates, and serves to steady the straight saw, when that description is being operated.

When a circular saw is to be treated in this apparatus, the guide-strip $l$ is removed, and the extension supporting-strips $m$, one on each side of the saw, attached to the projections $e$ $e$ of plates $c$ $c$.

A wedge-key, $n$, passes through both of the strips $m$ $m$, and serves to keep the saw pressed closely up against the die.

I will now proceed to describe the apparatus employed for the next step in the operation of treating the teeth, and bringing them to a uniform set. In figs. 1 and 2 will be seen drawings of the same, $g$ representing the saw as before, resting on a straight bed-plate, $o$, with a checked surface at $o'$, for the purpose of giving room for the widened teeth of the saw, thus allowing the body of the saw a firm bearing on the bed-plate $o$.

A second or top clamp-plate, $p$, is placed on the upper side of the saw, and firmly secured to it by the screw-clamp $q$.

$r$ is a plane or file-holder, of any convenient length required.

In a recess provided on its lower side is placed an iron plate, $s$, attached to the plane, and moved by set-screws $t$.

To this movable plate $s$ is attached, by suitable clamps, a file, $u$.

$v$ is a guide or gauge-strip, screwed to the side of the plane by screws $v'$, working in slots provided in the strip.

By this means the plane may be adjusted to any required thickness of saw, and, by the use of the set-screws $t$, the plane may be adapted to any size of set.

With the foregoing brief description of my invention in saw-teeth, and in the apparatus for forming the same, I will now proceed to describe its operation.

First, with reference to the saw-teeth.

By the use of my improvement, it is ascertained that the form of the teeth gives greater freedom to the saw-plate, from the fact that each tooth cleans the cut entirely through on each side, whereas the ordinary tooth does it only on one side.

My improved saw can be used in the gate from two to three times as long as the ordinary saw without being changed, and at the same time do from ten to fifteen per cent. more work in an equal length of time.

Considerable saving in time, and consequent expense, is also had in "dressing up" my improved saw.

Second, with reference to the operation of forming the teeth by the improved apparatus.

The apparatus being arranged substantially as described, the straight saw to be operated on is screwed into two clamps, one at each end, the clamps being attached to a suitable bench.

The connection between the apparatus and the saw is effected by removing the strap $g^3$, and placing the saw $g$ between the two plates $c$ $c$. This done, the strap $g^3$ is again put in place, and held there by the tapering key $g^4$. The wedge $g^1$ is also introduced, as shown in fig. 3.

By the action of the lever $g^2$, the eccentrics $g^5$, and the wedge $g^1$, the saw $g$ is moved forward until the tooth to be operated on comes into the bevelled check or recess $k'$, and retained firmly in that position.

Pressure is now brought to bear on the tooth by means of the lever $h$, strap $h^3$, and compression-bar $i$, to a sufficient extent to force the material composing the saw-tooth into the entire cavity of the bevelled recess $k'$, and thus give the required shape or form to the tooth. This being done, the saw is relieved by means of the lever $h$, &c., and the tooth just operated on is removed from the recess, the apparatus moved forward to a sufficient distance to enable the succeeding tooth to drop into the recess $k'$, when, by means of the lever $h$, the same process is repeated, and so on. All the teeth treated in the same die will, therefore, possess uniformity of size and shape.

The next, and finishing operation, consists in placing the saw just treated on the bed-plate $o$, and attaching it firmly to the same by the top plate $p$ and clamp $q$.

The file $u$ and gauge-strip $v$ are then properly adjusted on the plane, to suit the thickness and set of the saw. This done, the plane is passed back and forth over the teeth of the saw until their points are brought to a true line, which, by this process, can be accomplished with great exactness, on account of the plane or its file resting on a considerable number of teeth at one and the same time, also governed by the adjusting-guides.

The operation being accomplished on one side of the saw, the saw is reversed, and the opposite side treated in like manner.

When a circular saw is to be operated on, it may rest on its own axis, and have the apparatus applied to each tooth in succession by the employment of the extension-pieces $m$ $m$, fig. 4, which are adjusted to the size of the saw to be operated on, the guide-piece $l$, fig. 3, being removed to allow the teeth to pass, as shown in fig. 4.

By a slight modification of the dressing-machine, figs. 1 and 2, the circular-saw teeth may be brought to a true line or set, by causing the saw to revolve on its axis, which, in this case, will pass through the plates above and below.

As before stated, the apparatus heretofore employed for forming saw-teeth consists, in so far as my knowledge extends, of a simple swage, taper steel bar, and hammer, the swage being used for widening the very point of the tooth, while the bar and hammer are used for widening the upper side of the tooth. From this it is evident that uniformity of finish cannot be obtained.

What I claim as my improvement or invention, is the improvement in saw-teeth, and in the apparatus for forming the same, as follows:

1. Widening saw-teeth on their under or cutting-face by pressure, substantially as and for the purpose set forth.

2. Widening the saw-tooth at its under side in such a manner that the expanded cutting-face thereby produced is parallel-sided, or in the form substantially as shown in fig. 10, and as hereinabove described, for the purpose set forth.

3. The plates *c c*, when united by the bolts *d d*, and provided with the projections *e e* and the arm $h^2$, and having between them the space *f* and the space for the compression-bar, substantially as described.

4. In combination with said plates *c c*, constructed as above described, the lever *h*, pivoted at $h^1$, the strap $h^3$, the compression-bar *i*, and the die *k*, all operating together in the manner and for the purpose set forth.

5. In combination with said plates *c c*, constructed as above described, the wedge $g^1$, lever $g^2$, strap $g^3$, key, or equivalent, $g^4$, eccentric $g^5$, and pivots $g^6$ $g^7$ $g^8$, all operating together substantially as and for the purpose set forth.

6. The improved saw-dressing machine herein described, consisting of the bed-plate *o*, top plate *p*, clamp *q*, plane *r*, iron strap or file-holder *s*, adjustable screws *t*, file *u*, adjustable strip *v*, and adjusting-screws *v'*, all arranged and working together, substantially in the manner and for the purpose described.

JOHN LOUGH.

Witnesses:

CHARLES LEGGE,

CHARLES G. C. SIMPSON.